H. O. PEABODY.
Improvement in Knives for Uncapping the Cells of Honey-Comb.
No. 127,187.                                          Patented May 28, 1872.
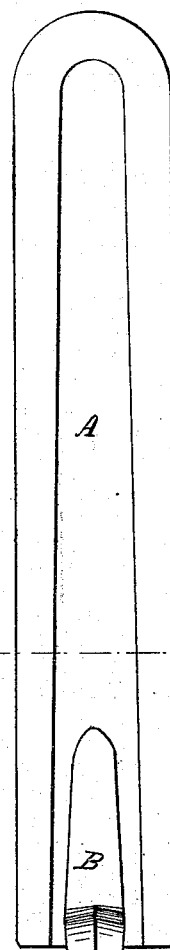
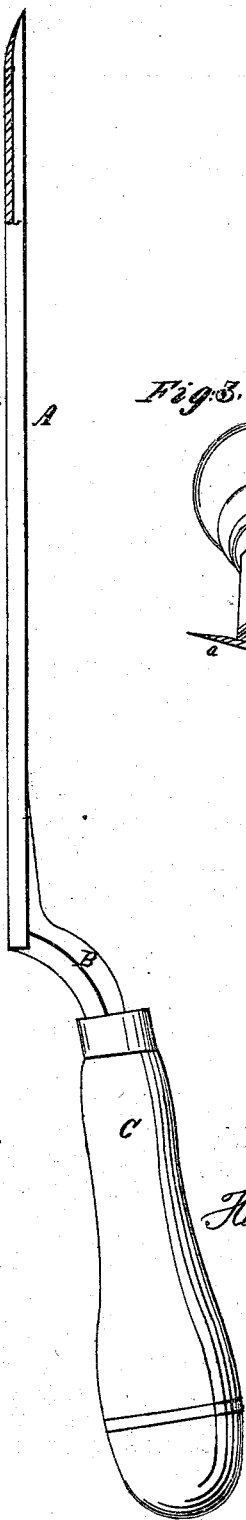
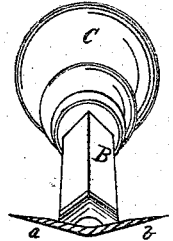

UNITED STATES PATENT OFFICE.

HENRY O. PEABODY, OF BOSTON, MASSACHUSETTS.

IMPROVEMENT IN KNIVES FOR UNCAPPING THE CELLS OF HONEY-COMBS.

Specification forming part of Letters Patent No. 127,187, dated May 28, 1872.

Specification describing a new and Improved Knife for Uncapping the Cells of Honey-Comb, invented by HENRY O. PEABODY, of Boston, in the county of Suffolk and State of Massachusetts.

Upon the introduction of machinery for extracting honey from the comb by centrifugal action it was found to be necessary to remove the caps from the cells of the comb before putting it into the machine, which was done by the use of a broad, thin, flat knife having two cutting-edges; but this knife was found to work hard on account of the large area coming in contact with the honey and comb, and the tendency to adhere thereto; and in order to use it at all it became necessary to keep the knife hot, which was done by having two knives, keeping one in hot water while using the other, and making frequent changes. To obviate the objections to the broad knife a knife of about half the width, with one cutting-edge, was used, which greatly improved the knife so far as ease of operation was concerned. But another difficulty, which in some degree applied to the wide knife, was greatly increased in the narrow one—viz., its liability to spring or bend upward, when being used, for want of proper stiffness—and thereby increasing the labor of uncapping the cells. To obviate these objections, and produce a knife for the purpose of removing the caps from the cells of honey-comb that shall have a narrow bearing upon its under side on the honey and comb, and have sufficient stiffness or rigidity to remain straight, or comparatively so, when in use, is the object of my invention; and it consists in forming the blade with two cutting-edges, the under side of each of said edges being ground flat, but at an obtuse angle to the other, so that when one of said flat surfaces is laid upon the comb, in the act of cutting, the other shall be raised at such an angle thereto as not to be brought in contact with the honey or comb, and vice versa, the upper surface of said knife being made concave, so as to form a thin edge and make a light but stiff knife. It further consists in forming the end of the blade furthest from the handle spoon-shaped, for the purpose of working into curved or crooked places, as will be described.

In the drawing, Figure 1 is a plan; Fig. 2 is a side elevation, with a portion of the blade shown in section; and Fig. 3 is a transverse section on line $x\ x$ on Fig. 1, looking toward the handle.

A is the blade of the knife, the under side of which is formed of the two flat surfaces $a$ and $b$, placed at an obtuse angle to each other, as shown, and the upper side made concave, or nearly parallel to the under side, the knife being ground upon the upper or concave side upon a stone of suitable diameter to grind both edges at once. The outer end or point of the knife is made somewhat spoon-shaped by swaging or otherwise, so that the bevel of the under side shall extend around the end, as shown, for the purpose of making the knife available for removing the caps in curved or uneven places on the comb. B is a shank riveted to the blade, and to which is secured the handle C. This knife can be used without heating.

I form the blade from sheet-steel of suitable thickness by cutting it to the proper shape and swaging it to the proper form in a die and grinding it upon the concave side on a stone of suitable diameter to act upon both edges at the same time; but if preferred the blade may be forged from a bar of steel.

What I claim as new, and desire to secure by Letters Patent of the United States, is—

1. A knife having a cross-section, substantially as herein set forth and described, for the purpose specified.

2. A knife having a spoon-shaped point, substantially as described, for the purpose specified.

Executed at Boston this 8th day of March, 1872.

HENRY O. PEABODY.

Witnesses:
 N. C. LOMBARD,
 DAVID T. PRAY.